United States Patent [19]
Parker et al.

[11] Patent Number: 5,288,103
[45] Date of Patent: Feb. 22, 1994

[54] AIRBAG COVER AND APPARATUS FOR PRODUCING AN INVISIBLE TEAR SEAM THEREIN

[75] Inventors: Thomas Parker, Strafford; Peter Iannazzi, Hampton, both of N.H.

[73] Assignee: Davidson Textron Inc., Dover, N.H.

[21] Appl. No.: 951,874

[22] Filed: Sep. 28, 1992

[51] Int. Cl.$^5$ ............................................. B60R 21/20
[52] U.S. Cl. ............................... 280/728 R; 428/217
[58] Field of Search .............. 280/728 B, 728 R, 732, 280/731; 428/212, 217

[56] References Cited

U.S. PATENT DOCUMENTS

| | | | |
|---|---|---|---|
| 3,640,546 | 2/1972 | Brawn | 280/732 |
| 3,991,005 | 11/1976 | Wallace | 428/217 |
| 4,246,213 | 1/1981 | Takamatsu et al. | 264/46.7 |
| 4,246,303 | 1/1981 | Townsend | 428/217 |
| 4,463,046 | 7/1984 | Hutchison | 428/217 |
| 4,562,025 | 12/1985 | Gray | 264/126 |
| 4,623,503 | 11/1986 | Anestis et al. | 264/302 |
| 4,769,199 | 9/1988 | Bemis et al. | 428/217 |
| 4,886,630 | 12/1989 | Sugiura et al. | 264/46.6 |
| 4,925,151 | 5/1990 | Gray | 249/65 |
| 5,082,310 | 1/1992 | Bauer | 280/732 |
| 5,183,288 | 2/1993 | Inada et al. | 280/732 |

FOREIGN PATENT DOCUMENTS

| | | | |
|---|---|---|---|
| 1-122753 | 5/1989 | Japan | 280/728 B |
| 4-197849 | 7/1992 | Japan | 280/728 B |

*Primary Examiner*—Karin L. Tyson
*Attorney, Agent, or Firm*—Reising, Ethington, Barnard, Perry & Milton

[57] ABSTRACT

A cover for an air bag unit is disclosed having a patterned tear seam therein defined by an integrally bonded, thermoplastic filler strip as the cover material and comprising a material having properties different than that of the cover material. Apparatus for forming the cover includes a thin shell mold having an inner surface that is heated to melt thermoplastic material cast thereon. A powder box adapted to contain thermoplastic material therein for distribution onto the thin shell mold carries a gasket having a shape corresponding to the tear seam shape. The powder box and gasket are adapted to be connected to the thin shell mold for forming a sealed footprint on the inner surface during distribution of the cast material against heated surface portions of the thin shell mold to form a thermoplastic cover with an opening therein that have the tear seam pattern. The opening is later filled with the lesser strength thermoplastic material to form an integrally bonded thermoplastic filler strip.

5 Claims, 3 Drawing Sheets

AIRBAG COVER AND APPARATUS FOR PRODUCING AN INVISIBLE TEAR SEAM THEREIN

BACKGROUND OF THE INVENTION

1. Technical Field

This invention relates to covers for air bag units located within the interior of a motor vehicle and in particular relates to covers having a tear seam therein that is configured to define an uninterrupted outer surface on the cover. Further, the invention relates to apparatus and a method for forming hidden tear seams in such covers for air bag units.

2. Description of the Related Art

Various proposals for covering air bag units have evolved. One primary objective is to provide a cover that has a weakened section therein that will separate upon air bag deployment to provide an opening in the cover through which the air bag can escape following vehicle impact that is sensed by a controller. A gas generator is ignited by the controller to produce gas for inflating the air bag as it is deployed.

Air bags are mounted in canisters that can be mounted in the steering wheel or in an instrument panel or crash pad on the driver's side of the vehicle. If the air bag is mounted on the passenger side, typically the canister is stowed behind an instrument panel either in a top mount position or in front mount position. Such mounting arrangements require that the cover material of the steering wheel hub or the skin or cover of the instrument panel be specially configured during manufacture to produce a weakened section to define a seam therein that will readily open during bag deployment.

Such manufacturing methods and resultant structure must consider various functional and aesthetic requirements. The seam must be configured to separate such the air bag can be deployed immediately after vehicle impact. However, the cover must have a seam that is configured such that the air bag unit is protected against either accidental or intentional tampering and additionally the seam should be configured to meet long term weathering and interior design appearance requirements. As to design appearance, there is a desire in some cases to form the surface of the cover as a smooth uninterrupted surface so that there is no indication that there is a air bag unit disposed beneath the surface. This interior design objective is desired both from a human psychology standpoint and from a pure esthetics standpoint. In the case of the psychological considerations, the smooth surface effectively meets the adage of out of sight out of mind such that a passenger is not reminded of the possibility of deployment of an air bag unit. The interior design consideration enables smooth flowing surfaces to be incorporated in the cover material of an instrument panel on the passenger side thereof.

U.S. Pat. No. 3,640,546, issued Feb. 1, 1972 to D.S. Brawn, includes a cover for a air bag unit having two doors that are covered by an outer layer of material that is weakened along a joint line by reducing the thickness of the outer layer. Such thin sectioned seam lines can cause a resultant depression over time that will essentially outline the outlet from the canister for the air bag component of the air bag unit. The arrangement does not solve either the psychological awareness problem or the problem of retaining a smooth, flowing surface appearance.

U.S. Pat. No. 4,246,213, issued Jan. 20, 1981 to Y. Takamatsu et al., discloses a method for casting a V-shaped section at the tear seam. While the outer surface of the cover material is smooth the V-shaped configuration also reduces the thickness of the outer layer in an undesirable manner.

U.S. Pat. No. 5,082,310 discloses a cover for an air bag unit. The cover includes two doors that are hinged for pivotal movement during air bag deployment. The doors are covered by a layer of foam and the layer of foam is covered by an outer skin having a V-shape groove that is cut to weaken the skin.

One problem common to designs that cut or score a tear seam into an outer skin is that plastic materials especially, at cold temperatures, are prone to becoming brittle such that the cut or score line can induce cracking along the seam. At opposite temperature extremes typical skin cover material such as thermoplastic olefins or thermoplastic polyvinyl chloride become relatively soft and deformable such that they will stretch and remain unbroken during initial bag deployment. Another problem that can arise with cut or scored tear seams is that they become observable (read through outer surface) following extended periods of exposure to heat and sunlight.

Another specific disadvantage of the cover shown in the '310 patent and another cover shown in U.S. Pat. No. 4,886,630 is that they require that the outer skin be separately formed on a heated mold and then removed from the mold and cut before being co-molded to a foam layer in a subsequent molding operation.

The problems arising from separately forming a skin and then cutting the grooves therein are obviated by the present method that employs casting techniques disclosed in U.S. Pat. No. 4,623,503, issued Nov. 18, 1986 to E. Anetis et al., U.S. Pat. No. 4,562,025, issued Dec. 31, 1985 to John D. Gray and U.S. Pat. No. 4,925,151 issued May 15, 1990 to John D. Gray all of which are commonly assigned to the assignee of the present invention and each of which is hereby incorporated by reference.

SUMMARY OF THE INVENTION

The present invention is directed to a cover assembly for an air bag unit. The cover assembly has a skin or a shell with a tear seam therein having a desired configuration such as the C, H, U, and X patterns commonly used to form tear patterns in the skin that will open during air bag deployment to form an opening through which the air bag will pass as it inflates to protect an occupant of the vehicle. In particular the skin or shell is formed of a first thermoplastic material having a predetermined thickness and a cast opening therein that has a configuration corresponding to a desired tear seam configuration and wherein the cast opening is filled with a second thermoplastic material to form an integrally bonded filler strip in the skin or shell but having tensile and elongation properties less than that of the first thermoplastic material that forms the skin or cover material such that the tear seam will not be elongated as much as the skin or shell at higher temperatures but will have sufficient compliance at lower temperatures to prevent cracking at the tear seam. This invention also contemplates the use of filler strip materials having other different properties, e.g. lesser shear strength, flexural strength, burst strength, etc.

Apparatus for forming the skin or shell for the cover assembly includes a heatable mold. A powder box carries a seal gasket that is shaped to correspond to the shape of the desired tear seam configuration. The powder box and seal gasket thereon is adapted to be connected to the heatable mold and to contain thermoplastic material such as thermoplastic olefins or thermoplastic material such as polyvinyl chloride (PVC) such as the pigmented particles or powder set-forth in U.S. Pat. No. 4,784,911 also commonly assigned to the assignee of the present invention and also incorporated herein by reference. The gasket pattern is arranged to impress against the surface of the heatable mold during the casting process and to leave a sealed footprint thereon that corresponds to the shape of the desired tear seam configuration.

When the heatable mold is connected to the powder box, the gasket seals the mold surface such that following casting and curing of the skin or shell an opening is formed therein around the perimeter of the gasket having the same pattern as the tear seam. In order to produce the cover of the present invention the opening is then filled with thermoplastic material having different tensile and elongation properties than that of the originally cast material so as to form a filler strip of material that will separate on air bag deployment to form an opening through which the air bag can pass immediately upon vehicle impact. Additionally, the filler strip blends with the remainder of the skin or shell such that the cover assembly for the air bag unit with the cover assembly having a smooth outer surface that will hide an underlying air bag unit.

Accordingly, an object of the present invention is to provide an easily assembled low cost outer skin or shell for use in a cover assembly for an air bag unit deployable into the passenger compartment of a motor vehicle wherein the outer skin has a preformed opening therein of the same thickness as the remainder of the outer skin but conforming to a desired tear seam configuration established by an end user and wherein the opening is filled to form an integrally bonded filler strip that combines with the outer skin to define a smooth, uninterrupted outer surface extending across both the preformed opening and the remainder of the outer skin.

A feature of the present invention is to provide such a low cost outer skin having a filler strip of a thermoplastic material that fills the preformed opening and wherein the filler strip is integrally molded with the remainder of the outer skin.

Another feature of the present invention is to provide a filler strip of thermoplastic material that fills the preformed opening having tensile and elongation properties different than such properties of the material forming the surrounding material of the outer skin.

Still another feature of the present invention is to provide such a low cost outer skin having a cast thermoplastic outer skin with a preformed opening therein conforming to a desired tear seam configuration and a filler strip of a second thermoplastic material that fills the preformed opening to form a smooth uninterrupted outer surface on the outer skin.

Another object of the present invention is to provide an improved apparatus for manufacturing the low cost outer skin of the present invention including a heatable mold member; a powder box and a gasket connected to the powder box that has a configuration that corresponds to the shape of a desired seam configuration for a cover assembly that hides an underlying air bag unit and wherein the gasket further is mounted to engage a surface portion of the interior of the heatable mold member to form a sealed footprint on the surface portion around which a thermoplastic material is cast to form an outer skin with a preformed opening therein corresponding to the shape of a desired seam configuration.

Still another object of the invention is to provide a method for forming a weakened tear seam in the cover for an air bag unit comprising the steps of sealing along a footprint corresponding to a tear seam, forming a preformed opening corresponding to a tear seam pattern in a first thermoplastic material, and filling the preformed opening with a second thermoplastic material having different tensile and elongation properties than those of the first material.

These and other objects, features and advantages of the present invention and a more complete understanding thereof will be apparent to those skilled in the art from the succeeding detailed description of the invention and the accompanying drawings thereof.

BRIEF DESCRIPTION OF THE DRAWINGS

A preferred exemplary embodiment of the present invention will hereinafter be described in conjunction with the appended drawings, wherein like designations denote like elements, and.

DESCRIPTION OF PREFERRED EMBODIMENT

Figure 7:
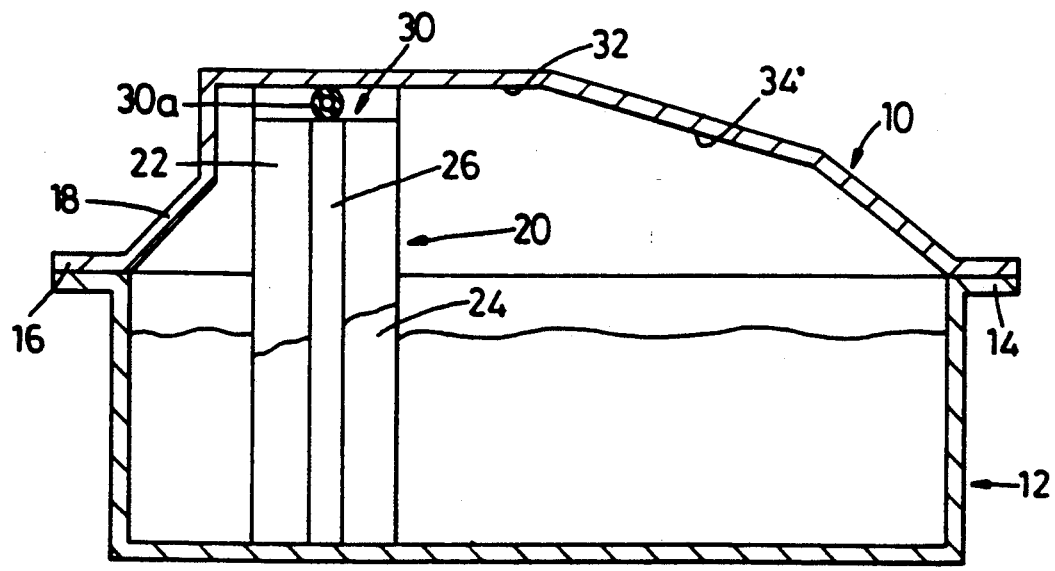
FIG. 7 is a diagrammatic view of a shell tool and powder box apparatus of the present invention having a tear seam pattern with gasket thereon.

In accordance with a preferred embodiment of the invention in FIG. 7 an apparatus 10 is illustrated for manufacturing the outer skin and air bag deployment cover assembly of the present invention. The apparatus 10 includes a powder box 12 having a peripheral portion 14 adapted to be connected to the peripheral portion 16 of a shell tool 18 by suitable clamps that join the peripheral portions in a known manner.

The powder box 12 has a tear seam pattern 20 connected thereto that includes two cross legs 22, 24 and a center portion 26 that form an H-shaped pattern. Each of the legs 22, 24 and the center portion extend beyond the depth of the powder box and outwardly of the peripheral portion 14 of the powder box such that they will penetrate into the interior of the shell tool 18 when the powder box 12 is clamped to the shell tool 18. Each of the legs 22, 24 and center portion 26 have a gasket mounting surface 28 thereon on which is affixed a gasket 30.

The gasket 30 is shown as an H-shaped configuration and is conformable to a flat surface region 32 on the inner surface 34 of the shell tool 18 such that it will bridge the distance between the mounting surface 28 and the flat surface region 32 and form a sealed foot print on the flat surface region 32. The gasket 30 can, of course, have any shape desired so long as it corresponds to the tear seam pattern.

Figure 6:
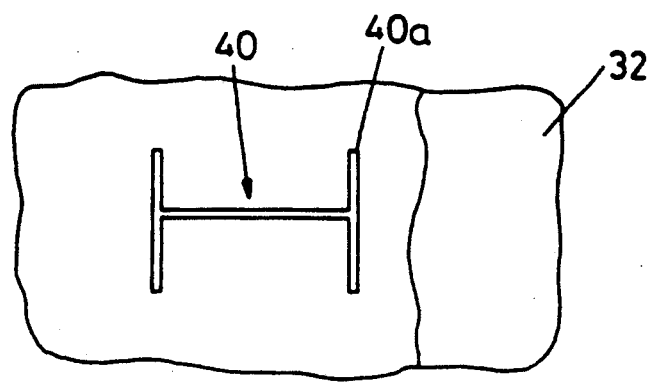
FIG. 6 is a fragmentary top elevational view of the shell tool following casting of a first thermoplastic material around the gasket footprint and following separation of the shell tool from the powder box and tear seam pattern gasket and showing a cast skin or shell having a preformed opening thereon corresponding to a desired tear seam configuration.
Figure 8:
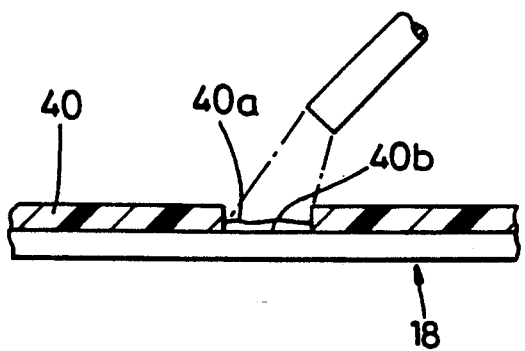
FIG. 8 is a diagrammatic view showing the preformed opening being filled while the skin remains in the shell tool.

The process for manufacturing the outer skin and cover assembly of the present invention includes initially locating the shell tool 18 in an inverted position as shown in FIG. 6 such that the inner surface 34 faces downwardly. The shell tool 18 is mated to the powder box 12 that contains a powdered thermoplastic material. When the peripheral portions 14, 16 are connected the shell tool 18 and powder box 12 form a sealed mold chamber 36 defined by the inner surface 34 and the interior walls of the powder box 12. The thermoplastic material can be a dry resin powder material with suitable coloring and plasticizer content, such as described in U.S. Pat. No. 4,923,657 issued May 8, 1990 to J.C. Gembinski et al. Shell tool is heated to a sufficient temperature to cause approximately one millimeter of dry powder to attach and fuse. Mold apparatus 10 is then rotated as a unit 180 degrees to dump the dry powder against the surface 34. Since the inner surface is heated, a layer of the dry powder forms across the surface 34 and about the outer peripheral edge 30a of the gasket 30 and fuses to form a skin 40 of plastic with an H-shaped gap or opening 40a therein at the foot print of the gasket 30. The remaining powder is dumped back into the powder box by rotating the mold apparatus 10 as a unit back to the initial position shown in FIG. 6. The powder box 12 and shell tool 18 are then disconnected and the shell tool 18 is heated more to cure the thermoplastic layer. Thereafter a second type of thermoplastic material is deposited within the H-shaped gap or opening 40a while the skin 40 is in the shell tool 10 (FIG. 8). The shell tool 10 is heated to suitably cure both the originally deposited material that makes up the skin 40 and the second deposited material that makes up a filler strip 40b that fills the gap 40a. Finally, the shell tool 10 is cooled and the skin 40 and H-configured filler strip formed integrally therewith are removed as a unit from the inner surface 34.

Automated production apparatuses for performing such steps are well known to those skilled in the art including U.S. Pat. No. 4,623,503, issued Nov. 18, 1986 to E. Anetis et al., U.S. Pat. No. 4,562,025, issued Dec. 31, 1985 to John D. Gray and U.S. Pat. No. 4,925,151 issued May 15, 1990 to John D. Gray. The manner of heating the shell tool 18 will depend upon a particular operation but it is contemplated that heating by directing a heated air stream on the outer surface 18a of the shell tool 18 will work. The gasket 30 cross-section can be a foam compressible material such as a temperature resistant foam or it can be a hollow gasket either of the inflatable or non-inflatable type such as is shown in U.S. Pat. No. 4,925,151 issued May 15, 1990 to John D. Gray.

Figure 1:
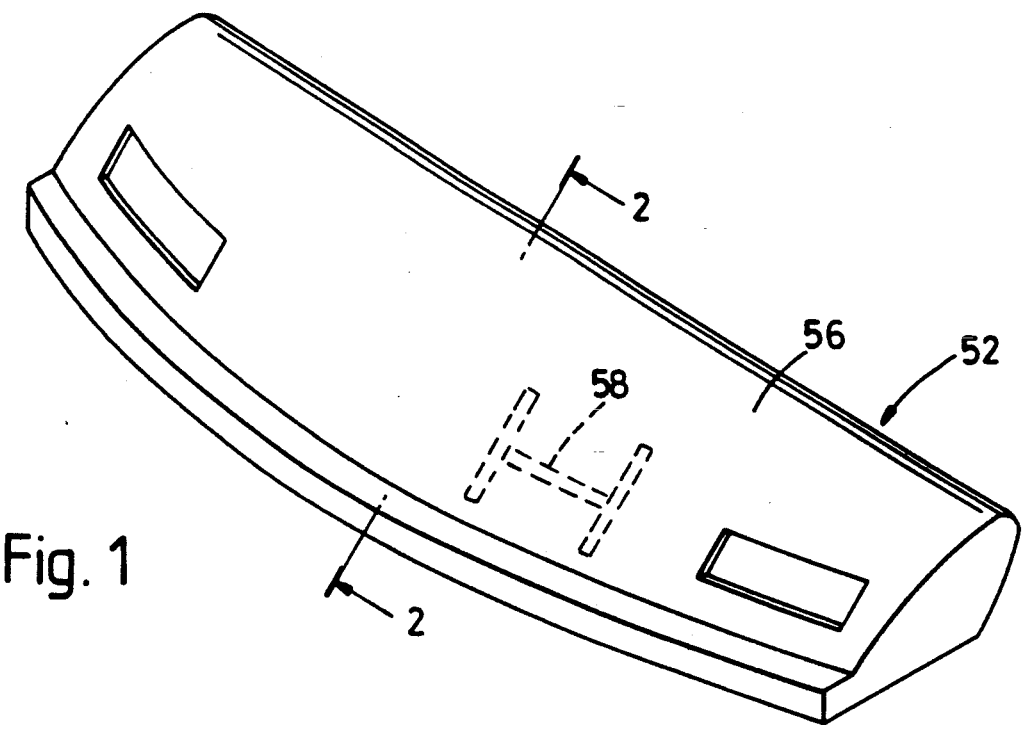
FIG. 1 is a perspective view of an automobile interior trim structure incorporating a tear seam of the present invention made from the apparatus of the present invention.
Figure 2:
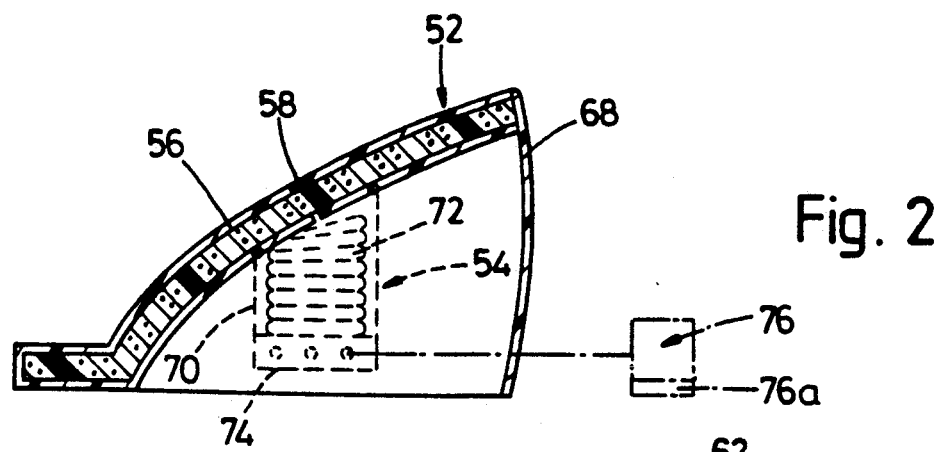
FIG. 2 is a cross-sectional view taken along the line 2—2 of FIG. 1 looking in the direction of the arrows.
Figure 3:
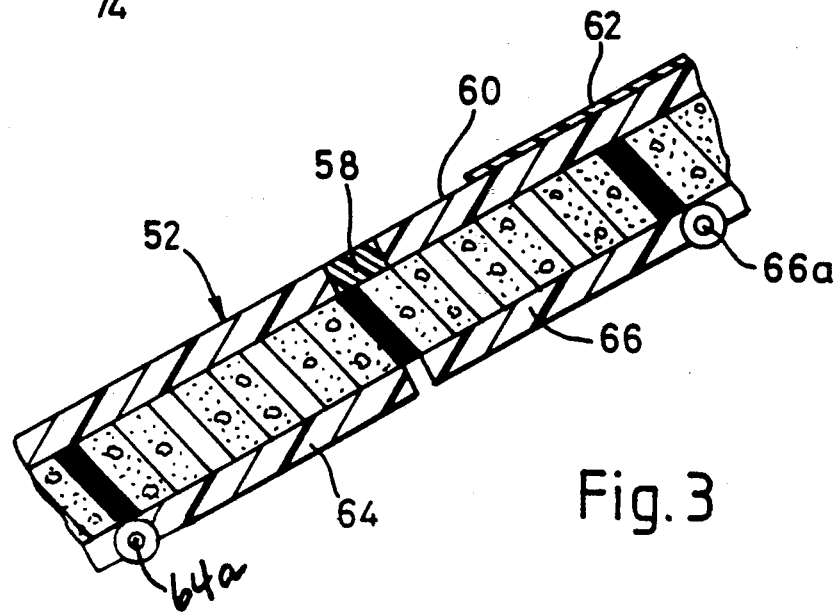
FIG. 3 is an enlarged cross-sectional view of the structure of FIG. 2 showing the detail of a preformed opening and filler strip components thereof.
Figure 4:
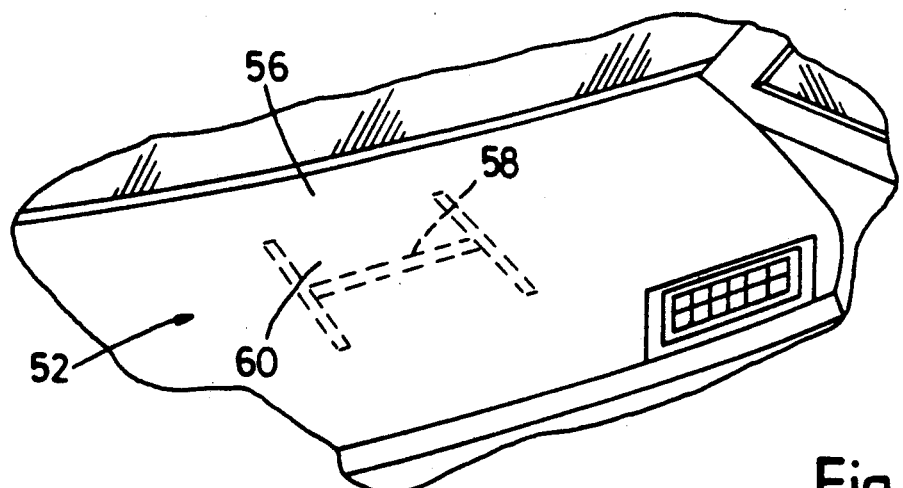
FIG. 4 is partial perspective view of an instrument panel mounted within an automobile interior compartment and showing in hidden lines a tear seam of the present invention overlying an air bag deployment cover.
Figure 5:
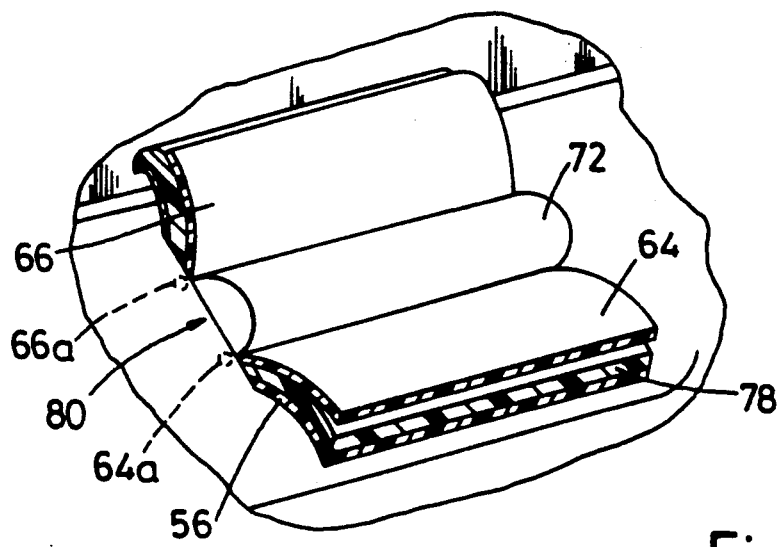
FIG. 5 is a partial perspective view of the instrument panel of FIG. 4 with the air bag deployment cover in an open position and with the tear seams therein separated.

FIGS. 1-5 show an automobile interior trim structure that includes a cover assembly 52 for hiding an air bag unit 54 shown in outline broken line form in FIG. 2. In FIG. 1 an outer skin 56 is shown having a H-shaped filler strip 58 therein of an integrally molded thermoplastic material having a lesser tensile strength than that of surrounding thermoplastic material of the outer skin 56. The cover assembly 52 has a smooth uninterrupted outer surface 60 that extends across the filler strip 58. Since the filler strip 58 is formed from a different type material than the remainder of the outer skin 56, in order to provide an identical surface appearance a thin paint coating 62 can be provided on the outer surface 60. Alternatively, the filler strip material and skin material can be blended to provide an identical appearance match. In the illustrated embodiment the cover assembly 52 includes a pair of doors 64, 66 formed as part of an insert 68 that forms an enclosure for an air bag canister 70 having a deployable air bag 72 therein. The air bag 72 is inflated by a gas generator 74 upon ignition in response to a signal from a controller 76 including collision sensing device 76a as is well known in the art. The configuration of the air bag unit and the arrangement of the components thereof will depend upon a particular application and form no part of the present invention. Furthermore, the cover assembly 52 can be formed to have a single door or other configuration that will spread open to bear against the outer skin 56 so as to cause separation thereof at the filler strip 58 that defines a lesser strength region in the outer skin 56 that will immediately separate upon air bag deployment. In the illustrated embodiment, the filler strip 58 forms an H-shaped tear seam within the outer skin 56. The doors 64, 66 will pivot about hinges 64a, 66a as shown in FIG. 3 to press through a foam layer 78 located between the insert 68 and the outer skin 56. The doors 64, 66 will act on the lesser strength region defined by the filler strip 58 to produce an immediate separation of the outer skin 56 to form an opening 80 as shown in FIG. 5 such that the air bag 72 will be free to deploy into the passenger compartment immediately following a collision that will ignite the gas generator 74 and inflate the air bag 72 for deployment through the opening 80 formed by the separation of the H-shaped tear seam.

In accordance with the invention the H-shaped tear seam has a surface smoothness like that of the surrounding regions of the outer skin such that the cover assembly 52 will appear as a continuous uninterrupted surface overlying the outlet from the canister that houses the air bag. It will of course be understood that the filler strip 58 that forms the lesser strength material region within the outer skin 56 can be shaped in other ways including C, U or X shapes as illustrated in co-pending U.S. patent application Ser. No. 680,837 filed Apr. 5, 1991 and commonly assigned with the present application. In one embodiment, the material of lesser strength is a spray deposited highly glass filled or carbonate or other filler filled thermoplastic PVC or polyolefin material and the surrounding material of the outer skin 56 is a thermoplastic material formed from PVC. The lesser strength material that forms the filler strip 58 has a lower tensile and elongation property in the operational temperature range than that of the material comprising the remainder of the outer skin that is integrally bonded to and in surrounding relationship to the periphery of the filler strip 58. Typically, the operational temperature range in an instrument panel can range from −30° C. to 104° C.

The outer skin 56 provides a tear seam at the filler strip 58 that has the necessary thickness to hide any tendency to read through the location of the doors or the outlet from the canister. Nevertheless, the filler strip 58 defines a tear seam that will provide an weak link at which the outer skin 56 will be easily separated.

Figures 9, 10:
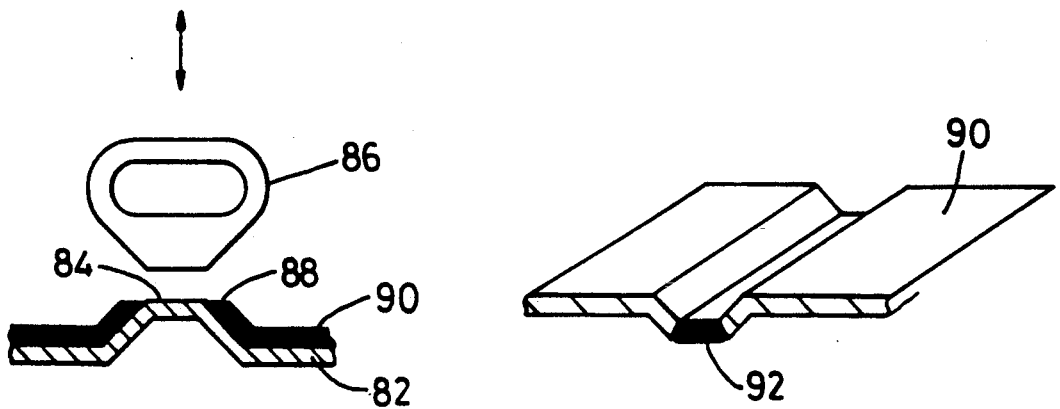
FIG. 9 is a fragmentary sectional view of apparatus used in practicing another embodiment of the method of this invention in forming another embodiment of an outer skin for the cover assembly of the present invention as shown in FIG. 10.
FIG. 10 is a fragmentary perspective view of the embodiment of the outer skin formed by the apparatus and method of FIG. 9.

In some cases, the need for a hidden seam line is less critical. If so, the method will include providing a nickel alloy mold shell 82 having a styling line protrusion 84 therein. As shown in FIG. 9, the sealing gasket 86 is positioned over the protrusion 84 to form a sealed footprint corresponding to a desired tear seam pattern. The first thermoplastic material is cast as layer 90. The gasket 86 is removed and a preformed opening 88 in layer 90 is then filled by casting, spraying or otherwise depositing a second layer of thermoplastic material of desired, different properties than of the first material. A resultant recessed styling filler strip 92 is formed on the layer 90 as shown in FIG. 10.

It will be appreciated from the foregoing description that the present invention not only includes an outer skin configuration that will assure cover assembly opening immediately upon vehicle collision but additionally a outer skin configuration that will hide an underlying air bag unit over long periods of time. Furthermore, the arrangement will protect an underlying air bag unit against either accidental or intentional tampering since there is no structure or door that can be pried open or inadvertently depressed into the structure of the air bag unit. It will be further appreciated by those skilled in the art that the foregoing description is for a preferred exemplary embodiment of the invention and that the invention is not limited to the specific embodiments or material selections shown or discussed. For instance, in the broader aspect of the outer skin, the seam forming gap can be filled with a suitable bonding material with desired tensile strength properties so long as the gasket formed gap therein is filled to form a smooth outer surface and a thickness of material that will prevent read through of underlying air bag unit components. For instance, in the broader aspect of the apparatus the gasket can be carried by a separate carriage apart from a powder box such that the initial skin can be formed around a gasket footprint by spray deposit of the thermoplastic material rather than rotational coating of the thermoplastic powder. For instance, in the broader aspect of the method, the initial coating with preformed opening can be formed by an injection molding or a spray step and the filling of the preformed opening can be accomplished by a rotational deposition of thermoplastic material of lesser strength and lesser elongation under operating temperature conditions. In addition to thermoplastic PVC spray coatings, the method of the invention contemplates the use of spray coating urethane materials to either form the preformed opening in the skin or shell or to form the filler strip.

Various changes and modifications will be apparent to those skilled in the art and all such variations and modifications are intended to come within the spirit and scope of the appended claims.

What is claimed is:

1. In a cover assembly for an air bag unit deployable into the passenger compartment of a motor vehicle through an opening in the cover assembly at a separable hidden tear seam in the cover assembly the improvement comprising:

an outer skin having a smooth outer surface;
    means forming a preformed opening in said outer skin; said preformed opening having a thickness corresponding to the thickness of the remainder of the outer skin and having a shape conforming to the outlet from the air bag unit;
    and a filler strip within said preformed opening integrally bonded to said outer skin and having an outer surface that joins to the outer surface of the outer skin to form a smooth uninterrupted outer surface extending across all of the outer skin whereby there is no readout of the presence of a air bag unit beneath the outer skin; said filler strip being weaker than the remainder of said outer skin whereby it will immediately separate to form an opening upon deployment of the air bag from the air bag unit.

2. The cover assembly of claim 1, further comprising:
    a filler strip of a thermoplastic material in said preformed opening and said filler strip integrally molded with the remainder of the outer skin.

3. The cover assembly of claim 1, further comprising:
    a filler strip of thermoplastic material that fills the preformed opening; said filler strip of thermoplastic material having a lesser tensile strength than said outer skin.

4. The cover assembly of claim 1, further comprising:
    said outer skin comprised of a first cast thermoplastic material and said filler strip comprised of a second thermoplastic outer skin that fills the preformed opening to form a smooth uninterrupted outer surface overlying the air bag unit.

5. The cover assembly of claim 4, further comprising a filler strip comprised of glass filled polyvinyl chloride or glass filled polyolefins.

* * * * *